United States Patent
Sokoll et al.

(10) Patent No.: US 6,655,502 B2
(45) Date of Patent: Dec. 2, 2003

(54) METHOD FOR MONITORING THE THICKNESS OF THE BRAKE LININGS OF A VEHICLE BRAKING SYSTEM

(75) Inventors: Günther Sokoll, Olching (DE); Ulrich Belzner, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/882,458

(22) Filed: Jun. 14, 2001

(65) Prior Publication Data

US 2002/0046909 A1 Apr. 25, 2002

(30) Foreign Application Priority Data

Jun. 14, 2000 (DE) .......................................... 100 29 238

(51) Int. Cl.$^7$ ............................ B60T 8/00; B60T 17/22; F16D 66/02
(52) U.S. Cl. .............................. 188/1.11 W; 188/1.11 L
(58) Field of Search ...................... 188/1.11 W, 1.11 L; 340/454, 453; 374/45, 100; 73/121, 129; 303/20; 116/208

(56) References Cited

U.S. PATENT DOCUMENTS 4,674,326 A * 6/1987 Reinecke .............. 188/1.11 W

FOREIGN PATENT DOCUMENTS

| DE | 34 07 716 | | 9/1985 |
| DE | 43 16 993 | | 11/1994 |
| DE | 10029238 | * | 12/2001 |
| GB | 2363436 | * | 12/2001 |

OTHER PUBLICATIONS

Translation of DE 4316993.

* cited by examiner

*Primary Examiner*—Douglas C. Butler
(74) *Attorney, Agent, or Firm*—Kenyon & Kenyon

(57) ABSTRACT

A method for monitoring the thickness of at least one friction partner of a vehicle friction brake, especially the brake linings of a vehicle braking system; for each braking action, the actuating time, the applied braking pressure, the relative speed between the brake lining and the moving brake element, as well as the prevailing temperature in this region, being taken into account in a wear model in such a manner, that the wear determined by the wear model is subtracted from a starting thickness of the friction partners, in particular, the brake linings, and each wheel of the vehicle being monitored individually. A preferred polynomial formulation is specified for the wear model. In the brake lining, at least one wear stamp can also be provided, upon reaching which the current, existing brake lining thickness and/or the polynomial formulation may be appropriately corrected.

6 Claims, No Drawings

METHOD FOR MONITORING THE THICKNESS OF THE BRAKE LININGS OF A VEHICLE BRAKING SYSTEM

FIELD OF THE INVENTION

The present invention relates to a method for monitoring the thickness of at least one friction partner of a vehicle friction brake, especially the brake linings of a vehicle braking system; for each braking action, the actuating time, the brake actuating pressure, the relative speed between the brake lining and the moving brake element, as well as the prevailing temperature in this region, being taken into account in a wear model, in such a manner, that the wear determined by the wear model is subtracted from a starting thickness of the friction partners, in particular, of the brake linings.

BACKGROUND INFORMATION

In regard to the background information, reference is made to both German Published Patent Application No. 34 07 716 and German Patent No. 43 16 993.

In motor vehicles, the brake disks and, in particular, brake linings must be monitored in regular intervals for their state of wear, using checks or visual inspections. In addition, it is known that, in order to sense the state of wear of the brakes, especially the maximum allowable wear of the brake pads of disk brake systems, either an electrically conducting, sliding contact integrated in the brake pad, or alternatively, a wear sensor (so-called "wear pill") separately installed in or on the brake pad, is provided with one or more internal sliding contacts. Depending on the specific embodiment, and in response to a selected, critical degree of wear of the brake pad, i.e. when the wear sensor is exposed, an electrically conducting contact point comes into contact with the brake disk, thereby causing an electrical short circuit or disconnecting an electrical, sliding contact, i.e. an externally imposed flow of electrical current is interrupted. The respective change of the electrical state can then be communicated to the driver, using a suitable evaluation or display unit. For the most part, this display is accomplished by activating a brake warning light in the instrument panel of the motor vehicle, whereby the driver is informed of the necessity of replacing the brake pad.

Because of structural conditions and the high thermal loading of the brake linings and wear sensors, the above-described technique of sensing wear and displaying it generally allows only the display of a few individual, discrete wear stages of a vehicle brake lining. In order to have a longer-term overview of a possibly required change of brake lining, a continuous evaluation and display of the wear state of vehicle brake linings would be desirable.

In principle, this is possible by way of a simulation model, that is, the wear of the brake linings is continuously calculated from their determined loading. This is described in principle in the document German Published Patent Application No. 34 07 716 mentioned at the outset, which includes a device and a method for measuring the thickness of parts subject to wear, and especially, for monitoring the brake linings in a motor vehicle. In order to be able to indicate the wear of these parts subject to wear, i.e. brake linings, the actuating time, the applied brake pressure, and the relative speed of the parts subject to wear (i.e. the relative speed of the brake lining with respect to the brake disk, or in general, with respect to a so-called moving brake element) are measured during each braking action, and are evaluated in an evaluator, using a so-called wear model stored therein, and the corresponding result is displayed.

In this context, the document German Patent No. 43 16 993, which is also mentioned at the outset, constitutes additional related art. It describes a method for determining the state of a vehicle braking system, where, in order to determine the residual thickness of the brake lining, the values of quantities influencing the residual thickness of the brake lining are ascertained during the time of each braking action, and where the frictional work and friction power to be performed and transmitted by each brake lining are calculated using these ascertained values, and are utilized for determining the residual thickness of the brake lining. In this context, the starting thickness values of the brake linings are initially stored, and at least the vehicle weight, the vehicle motion, the rotational motion of the wheels, and the inclination of the road are utilized as the variables influencing the residual thickness of the brake lining, and as the measured variables determining the energy balance of the vehicle. During the respective braking action, the frictional work performed is then calculated, using the measured values for the measured variables determining the energy balance of the vehicle, by considering the energy balance, and, using the calculated frictional work, the ascertained, measured values, as well as a corresponding, stored, so-called wear-thickness frictional-work characteristic, the brake-lining wear-thickness values assigned to the respective braking action are ascertained, according to which the brake lining wear thickness values ascertained for the respective brake application are subtracted from the residual thickness values existing prior to this braking action, and the newly determined, residual thickness values are stored.

With the increasing use of vehicle stability control systems in motor vehicles, the wheels are increasingly decelerated in a selective manner; that is, in the case of a four-wheel passenger car, for example, only the left rear wheel is decelerated, or the right rear wheel is decelerated more sharply than the left front wheel. Of course, this leads to uneven wear on the individual brake linings of the individual vehicle wheels, so that a global simulation or wear model, as described in the known related art, i.e. in the two acknowledged documents, does not supply sufficiently accurate results.

SUMMARY OF THE INVENTION

Therefore, an object of the present invention is to provide a correspondingly improved method for monitoring the thickness of the brake linings of a vehicle braking system.

DETAILED DESCRIPTION

Thus, a continuously functioning wear display is proposed, in particular, for the brake lining, but if desired, for the two friction partners of a vehicle friction brake, as well; the wear display being based on a calculation algorithm implemented in an electronic control unit by software, and enabling the wear (especially that of the brake lining) to be (virtually) detected continuously, wheel-specifically, and indeed, separately for each vehicle wheel during vehicle operation Therefore, the residual thickness of each individual brake lining can be retrieved and displayed, so that, in response to the allowable wear being exceeded, only the brake lining whose state of wear is shown to be critical is selectively replaced. When selectively replacing the brake lining in such a manner, it is then not necessary to check and replace the brake linings of the other vehicle wheels, unless their individually determined state of wear or their residual thickness is already close to the value critical for replacement. Using wear models that function in a wheel-specific manner, variable, driving-condition-dependent loads at the individual wheel brakes (e.g., that are produced by starting from rest, using braking action for a traction control system, or produced by different road conditions on the right and left vehicle wheels, or the like) can therefore be taken into consideration, and consequently, operating states having unequal brake wear can be considered along with their effect.

Therefore, during continuous vehicle operation, it is possible to provide the driver of a vehicle, which is equipped with an electronic control unit or monitoring unit functioning according to the method of the present invention, with a continuous display of the operating-brake wear state, and in principle, both that of the brake linings, and that of their friction partners, i.e. that of the wheel-specific brake disks or the like. In addition, it is possible for the service stations to diagnose the current wear state of individual wheel brakes, using suitable devices, without the necessity of expensive monitoring or visual inspection of the wheel brakes themselves.

Along the lines of an advantageous further refinement of the present invention, the remaining mileage of a friction partner up to replacement, and in particular, that of a brake lining, can be calculated in an approximation model from the residual thickness of the friction partner, and can be displayed. The driver or user of the vehicle is then informed in an extremely user-friendly manner, about when he or she should expect to replace a brake lining, or in general, a friction partner of the vehicle friction brake. This can be accomplished in a relatively simple manner when, for example, empirically determined correlations between the residual thickness and the remaining mileage (based on the vehicle) are stored in a characteristic curve or a characteristics map.

With the aid of a wear model used according to the present invention, one can dispense with using the brake lining wear sensors mentioned at the outset, which, apart from a weight reduction, results in cost savings. On the other hand, a combination with an additional, built-in wear sensor system can be provided at the vehicle brakes. For when at least one wear sensor, which is also called a wear stamp ("wear pill" or the like), is in the brake lining, then, upon reaching this wear stamp, the current brake lining thickness resulting from the model calculation can, if necessary, be corrected (in a wheel-specific manner, as well) in the electronic control unit or monitoring unit performing the described monitoring.

Apart from the correction of the brake lining thickness, the wear model itself can also be corrected here, especially by incorporating a suitable multiplicative correction factor into the polynomial formulation for the wear model. This can be used to take special wear conditions into account, which cannot easily be covered by the usual calculation algorithm. An example of this includes driving off-road under extreme conditions, where the amount of dirt or sand is high, which is known to possibly increase the wear. However, another example is the variability of the quality of the brake linings with regard to their wear performance. Therefore, the correction made possible by a wear stamp appears in the further, future wear calculation, the so-called wear correction factor or the like for the wear polynomial being stored in the electronic monitoring unit, and always being considered in the further calculation.

A further correction can be made, i.e. a possible, further wear correction factor can be calculated, in response to reaching a possible, additional wear mark in the brake lining. Even after the brake lining is replaced, and the lining thickness values (and possibly the remaining mileage values) are consequently reset, this stored wear correction factor appears in the wear calculation until a wear stamp is reached again. Furthermore, different wheel-specific, or at least axle-specific wear correction factors can be provided, in order to further increase the accuracy of the calculation; that is, there are then different wear correction factors for the wear polynomial, due to different brake designs for the front axle and rear axle of a passenger car.

The calculation algorithm for determining the brake lining wear is based on the physical assumption, that the wear is proportional to the power converted in the brake, i.e. proportional to the product of the braking force or applied braking pressure, and the wheel speed (=relative speed of the friction partners, namely, between the brake lining and brake disk or the like, and in general, between the brake lining and the moving brake element). In addition, the underlying thermodynamic, hydraulic, tribological, as well as geometric parameters for the specific vehicle brake can also be of importance in this case; i.e. temperature effects, as well as effects of the vehicle speed, and of the coefficient of friction between the friction partners, or in other words, between the brake lining and the so-called moving brake element.

Since these mentioned, physical, descriptive quantities are not readily available or not easily determinable, it is also proposed that the so-called wear function or the so-called wear model used to calculate the brake wear be simulated as a function of the above-mentioned physical quantities, using an empirical approximation function. Assuming that the effect of the temperature on the coefficient of friction between the friction partners (i.e. between the brake lining and, e.g. brake disk) is small in the first approximation, and a geometric dependence is not significant, then the result for this approximation function is the following polynomial formulation, which is differentiated with respect to time t, and can also be referred to as a wear polynomial:

$$dV = (A_n \delta^n + A_{n-1} \delta^{n-1} + \ldots + A_0) \cdot (B_m p^m + B_{m-1} p^{m-1} + \ldots + B_0) \cdot (C_k u^k + C_{k-1} u^{k-1} + \ldots + C_0) \cdot dt$$

"V" being the wear expressed by the physical unit (distance/time), "$\delta$" standing for the temperature of the brake in Kelvin or ° C., "p" representing the applied braking pressure in bar, and "u" representing the relative speed between the friction partners (brake lining and, for example, brake disk), and therefore representing the wheel speed in [m/s] or [km/h]. "$A_n \ldots A_0$, $B_m \ldots B_0$, $C_k \ldots C_0$" are constant coefficients specific to the vehicle braking system.

In the case of braking, the calculation of the wear degree of a wheel-specific brake lining or friction partner can be described mathematically, in a highly accurate manner, by integrating this mentioned polynomial formulation, whereby, depending on the required accuracy, a simplification is possible in this regard, by expressing the dependence of each of the mentioned variables $\delta$, p, and v in a 2nd order polynomial, i.e. each of the natural numbers n, m, and k contained in the mentioned polynomial statement to then take on the value of "2".

As mentioned previously, coefficients $A_n \ldots A_0$, $B_m \ldots B_0$, and $C_k \ldots C_0$ included in the named polynomial formulation are constant vehicle-specific and braking-system-specific values, which can preferably be determined recursively, in an experimental manner, either by a driving test or by test stand trials, from a plurality of test series. The additional variables or boundary conditions going into the equation, namely, current brake temperature $\delta$, wheel-specific, applied braking pressure p between the friction partners, as well as relative speed u between the friction partners, i.e. between the brake lining and the moving brake element, can be determined by measurements or by parallel approximation algorithms, which preferably run in the electronic control unit for the vehicle braking system, or the like.

Of course, the wear model or polynomial formulation named for this can be expanded, thus, e.g. by a so-called friction coefficient function, which takes into account the dependence of the friction coefficient between the friction partners, on brake temperature δ; and if necessary, can also be expanded by additional parameters, which consider, e.g. geometric influence variables, in particular, a so-called plane-geometrical influence function between the brake lining and moving brake element. In addition, it is also possible to monitor special wear conditions, which cannot be taken into account by the calculation algorithm described up to this point, such as, e.g. driving off-road under extreme conditions, where the amount of dirt or sand is high, which is known to possibly increase wear. This can indeed be accomplished by additive or multiplicative terms in the wear model or the corresponding polynomial formulation.

The sequence of a wheel-specific wear calculation or residual thickness calculation according to the present invention, at the respective brake, especially for the respective brake lining, can be as follows:

When the vehicle is started up, the current state of wear or the so-called starting thickness of the brake lining is retrieved in a corresponding electronic monitoring unit, from a storage device, which, in particular, is even able to save values when the vehicle is shut down, and is therefore, e.g. in the form of EEPROM. In each braking action, wear V occurring in this case is determined separately for each wheel brake, using the individually measured or estimated, current values for brake temperature δ, applied braking pressure p, and relative speed u between the brake lining and the moving brake element (i.e., between the friction partners); not only the wear of the brake lining being determinable, but also that of the moving brake element, e.g. that of the brake disk.

This is preferably accomplished by the above-described wear model, i.e. accomplished mathematically, by integrating the (preferred) equation $$dV = (A_2\delta^2 + A_1\delta + A_0) \cdot (B_2p^2 + B_1p + B_0) \cdot (C_2u^2 + C_1u + C_0) \cdot dt$$

over time period t of this braking action, according to which the now current, new wear state is determined by subtracting the now current wear resulting from the current braking action, from the preceding residual thickness or starting thickness of the brake lining. Using the new wear state or the new residual thickness that represents the so-called starting thickness for the next braking action, a remaining mileage, in accordance with which the brake lining (or in general terms, a friction partner of the vehicle friction brake) should be replaced, can also be individually calculated for each brake lining of each vehicle wheel.

If, during a braking action, a previously mentioned wear stamp is reached in one of the brake linings, then an individual, geometrically exact, defined wear state or a geometrically exact, defined, residual thickness exists for this brake lining here, so that an appropriate correction can be made in the electronic monitoring unit, i.e. this determined value can be used and stored as the current value for the brake lining thickness; it also being possible to calculate the previously mentioned, so-called wear correction factor for the wear polynomial, the wear correction factor then being used for the further calculations. When a brake lining is replaced, the new wear state resulting therefrom, or its new residual thickness, or its so-called starting thickness is stored in the electronic monitoring unit, whereby it should be pointed out that quite a number of details deviating from the above explanation can be designed without departing from the scope of the present invention.

What is claimed is:

1. A method for monitoring a thickness of at least one friction partner of a vehicle friction brake corresponding to a brake lining of a vehicle braking system, comprising the steps of:

taking into account, in a wear model, an actuating time, an applied braking pressure, a relative speed between the brake lining and a moving brake element, and a prevailing temperature in a region of the brake lining in such a manner that a wear determined by the wear model is subtracted from a starting thickness of the brake lining;

individually monitoring each wheel of the vehicle; and forming the wear model by a polynomial statement including at least the following factors:

$$dV = (A_n\delta^n + A_{n-1}\delta^{n-1} + \ldots + A_0) \cdot (B_mp^m + B_{m-1}p^{m-1} + \ldots + B_0) \cdot (C_ku^k + C_{k-1}u^{k-1} + \ldots + C_0) \cdot dt,$$

wherein $A_n \ldots A_0$, $B_m \ldots B_0$, $C_k \ldots C_0$ are constant coefficients specific to the vehicle braking system.

2. The method according to claim 1, further comprising the step of:

apart from a correction of a current, existing brake lining thickness, correcting the wear model by incorporating a suitable multiplicative correction factor into the polynomial statement for the wear model.

3. A method for monitoring a thickness of at least one friction partner of a vehicle friction brake corresponding to a brake lining of a vehicle braking system, comprising the steps of:

taking into account, in a wear model, an actuating time, an applied braking pressure, a relative speed between the brake lining and a moving brake element, and a prevailing temperature in a region of the brake lining in such a manner that a wear determined by the wear model is subtracted from a starting thickness of the brake lining;

individually monitoring each wheel of the vehicle; and forming the wear model by a polynomial statement including at least the following factors:

$$dV = (A_n\delta^n + A_{n-1}\delta^{n-1} + \ldots + A_0) \cdot (B_mp^m + B_{m-1}p^{m-1} + \ldots + B_0) \cdot (C_ku^k + C_{k-1}u^{k-1} + \ldots + C_0) \cdot dt,$$

wherein $A_n \ldots A_0$, $B_m \ldots B_0$, $C_k \ldots C_0$ are constant coefficients specific to the vehicle braking system, a wear stamp is provided in the brake lining, and upon reaching the wear stamp, a current, existing brake lining thickness in a calculation of the wear model is corrected.

4. The method according to claim 3, further comprising the step of:

apart from a correction of the current, existing brake lining thickness, correcting the wear model by incorporating a suitable multiplicative correction factor into the polynomial statement for the wear model.

5. A method for monitoring a thickness of at least one friction partner of a vehicle friction brake corresponding to a brake lining of a vehicle braking system, comprising the steps of:

taking into account, in a wear model, an actuating time, an applied braking pressure, a relative speed between the brake lining and a moving brake element, and a prevailing temperature in a region of the brake lining in such a manner that a wear determined by the wear model is subtracted from a starting thickness of the brake lining; and individually monitoring each wheel of the vehicle, wherein:

a wear stamp is provided in the brake lining, and upon reaching the wear stamp, a current, existing brake lining thickness in a calculation of the wear model is corrected.

6. The method according to claim 5, further comprising the step of:

apart from a correction of the current, existing brake lining thickness, correcting the wear model by incorporating a suitable multiplicative correction factor into a polynomial statement for the wear model.

* * * * *